June 27, 1939. J. A. HEEREN 2,163,682

LEVELING SHOVEL ATTACHMENT FOR TRACTOR FRONT WHEELS

Filed Jan. 12, 1938

INVENTOR.
John A. Heeren
BY Sam J. Slotsky
ATTORNEY

Patented June 27, 1939

2,163,682

UNITED STATES PATENT OFFICE 2,163,682

LEVELING SHOVEL ATTACHMENT FOR TRACTOR FRONT WHEELS

John A. Heeren, Le Mars, Iowa

Application January 12, 1938, Serial No. 184,577

1 Claim. (Cl. 37—172)

My invention relates to a tractor attachment for standard tractors.

An object of my invention is to provide a leveling arrangement which will work in combination with the forward wheels of a tractor.

A further object of my invention is to provide a leveling attachment which will level the ground surface forwardly of the tractor's front wheels as the tractor moves forwardly.

A further object of my invention is to provide means for conveniently raising and lowering the leveling attachment.

A further object of my invention is to provide limiting means for limiting downward motion of the shovel or leveling attachment.

A further object of my invention is to provide means for controlling the leveling attachment from the seat of the tractor, and to provide such a device having simple characteristics and which can be manufactured at a reasonable cost.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1:
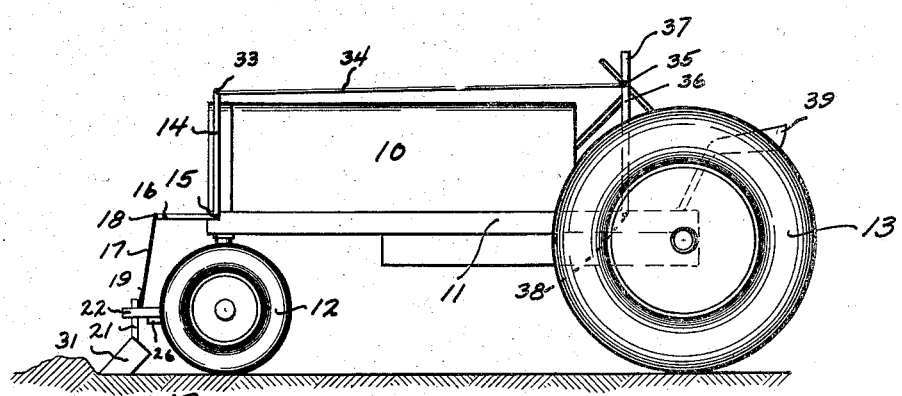
Figure 1 is a side elevation of a tractor employing my device.
Figure 2:
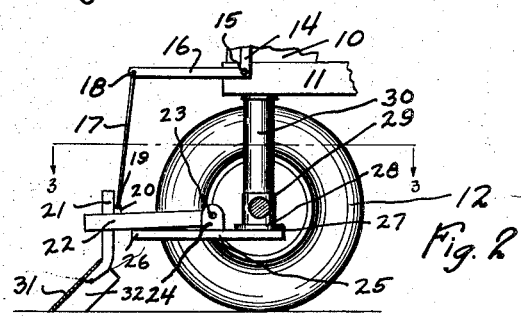
Figure 2 is an enlarged detailed section taken transversely of the front axle.
Figure 3:
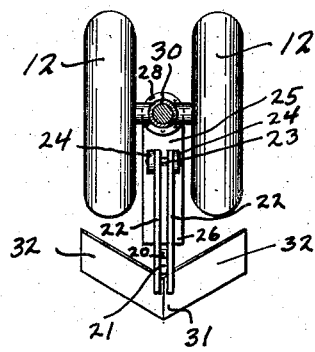
Figure 3 is a sectional view taken along the lines 3—3 of Figure 2.

The ordinary tractor of the usual type in traveling over rough ground, is subject to a great deal of vibration and jars caused by the uneven surface acting against the forward wheels of the tractor. The forward wheels furthermore, in being small in diameter exaggerate this effect, and the principal objective of my invention is to provide a leveling device forwardly of these wheels so that the surface can be smoothed correspondingly.

I have used the character 10 to designate generally the tractor including the frame 11. I have used the character 12 to designate the forward wheels and the character 13 the larger rear wheels, and the type shown illustrates the rubber tired type of tractor although it will be understood that the invention applies to any other type as well. A vertical rod 14 is pivoted at 15 to the side of the tractor and extending forwardly from the pivoting point 15 is the further rigid rod 16 which moves with the rod 14. A cable or chain 17 if such is desired is attached at 18 to the rod 16. The cable 17 is attached at 19 to the member 20 which is attached rearwardly of the shoe member 21. A pair of strap members 22 receive the shoe 21 which strap members extend rearwardly and are pivoted at 23 to the upstanding lips 24. The upstanding members 24 are attached to the plate 25 which extends forwardly to the position 26 against which the straps 22 rest to limit downward movement of the leveling device.

Figure 4:
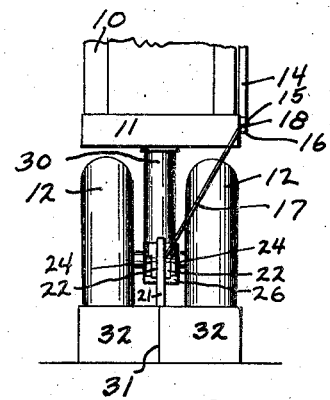
Figure 4 is a front elevation.

The flat plate 25 is rigidly attached at 27 to the flange 28 which is the termination of the usual boxing 29 which in turn terminates into the steering spindle 30 of the tractor. The shoe 21 has attached to it a suitable shovel member 31 having the rearwardly diverging faces 32 and it will be understood that any type of shovel can be employed for this purpose having angular contour or any other contour. Attached to the upper end of the lever 14 at 33 is the substantially horizontal cable or chain member 34 which is attached at 35 to the lever 36 having the handle extension 37. The lever 36 is pivoted to the tractor frame at 38 and any suitable stop devices can be used in limiting forward motion of the lever 36. It will be noted from Figure 4 that the cable 17 extends angularly from the side of the frame without interfering with the lifting arrangement, however, and it will be noted that the driver of the tractor when being seated upon the seat 39 can raise the shovel when desired by simply pulling the lever 36 toward the seat and conversely the shovel can be released into operative position by releasing the lever which causes the straps 22 to rest upon the forward portion 26 of the plate 25. In such position as the tractor travels forwardly, the shovel maintains a clear and level path for the wheels and the various cultivating devices which can be placed between the forward and rearward wheels of course smooth the surface rearwardly of the forward wheels.

In this manner in traveling transversely to existing furrows and the like, the surface is leveled for the tractor which will then travel upon a level surface eliminating objectionable jars and the like to the tractor frame. It will now be seen that I have provided a tractor attachment which will work in combination with the forward wheels of a tractor, which levels the ground surface forwardly thereof, which can be conveniently raised or lowered, which provides means for maintaining the lowered position in a positive manner, which is simple in construction and can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

A leveling attachment for tractors comprising a shovel member positioned forwardly of the tractor front wheels for leveling the ground surface forwardly thereof, means for raising said shovel member to inoperative position, including a pair of straps, a shoe member attached therebetween, said shoe member having an angular projection to which said shovel is attached, a cable attached to said shoe member, means for pulling the cable upwardly, means for limiting downward movement of the shovel to a position flush with the lower sides of the tractor front wheels including a flat plate rigidly attached to the forward tractor spindle, said flat plate having a forward extension against which said straps rest when the shovel is in operative position, a pair of upstanding ears attached to said plate forwardly of said spindle, said straps being pivoted to said ears.

JOHN A. HEEREN.